US006646644B1

(12) United States Patent
Suzuki et al.

(10) Patent No.: US 6,646,644 B1
(45) Date of Patent: Nov. 11, 2003

(54) TONE AND PICTURE GENERATOR DEVICE

(75) Inventors: Hideo Suzuki; Satoshi Sekine; Yoshimasa Isozaki; Tsuyoshi Miyaki, all of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/271,724

(22) Filed: Mar. 19, 1999

(30) Foreign Application Priority Data

Mar. 24, 1998 (JP) .......................................... 10-093867

(51) Int. Cl.[7] ................................................ G06T 15/70

(52) U.S. Cl. ....................... 345/474; 345/473; 345/475; 84/600; 84/622; 84/633

(58) Field of Search ................................ 345/473, 474, 345/475; 84/622, 600, 633

(56) References Cited

U.S. PATENT DOCUMENTS

| | | | | |
|---|---|---|---|---|
| 5,005,459 A | * | 4/1991 | Adachi et al. | 84/453 |
| 5,220,117 A | * | 6/1993 | Yamada et al. | 84/600 |
| 5,247,126 A | | 9/1993 | Okamura et al. | |
| 5,286,908 A | | 2/1994 | Jungleib | |
| 5,287,347 A | | 2/1994 | Spanke | |
| 5,391,828 A | | 2/1995 | Tajima | |
| 5,559,299 A | | 9/1996 | Tajima | |
| 5,621,538 A | | 4/1997 | Gnant et al. | |
| 6,005,180 A | * | 12/1999 | Masuda | 84/622 |
| 6,160,907 A | * | 12/2000 | Robotham et al. | 345/473 |

FOREIGN PATENT DOCUMENTS

| | | |
|---|---|---|
| EP | 0 738 999 | 10/1996 |
| GB | 2 328 553 | 2/1999 |
| JP | 3-216767 | 9/1991 |
| JP | 8-30807 | 2/1996 |
| JP | 8-293039 | 11/1996 |
| TW | 088104379 | 9/2001 |

OTHER PUBLICATIONS

Cover Sheet of "Director".

* cited by examiner

*Primary Examiner*—Mark Zimmerman
*Assistant Examiner*—Kimbinh T. Nguyen
(74) *Attorney, Agent, or Firm*—Morrison & Foerster LLP

(57) ABSTRACT

There is provided a database storing motion components, each of which includes motion information representative of a performance motion trajectory corresponding to a subdivided performance pattern for each musical instrument or part along with sounded point markers specifying tone-generation timing in the motion information. Motion components corresponding to the performance information are sequentially read out from the database to create basic motion information, and a three-dimensional picture is generated on the basis of the basic motion information and visually shown on a graphic display unit. Picture to be thus displayed can be selected optionally via a musical instrument change switch, player change switch and stage change switch, and the selected picture can be displayed in any desired direction by means of a viewpoint change switch.

10 Claims, 10 Drawing Sheets

TONE AND PICTURE GENERATOR DEVICE

BACKGROUND OF THE INVENTION

The present invention relates to a tone and picture generator device which can generate tones and visually display a performance scene of the generated tones in three-dimensional pictures.

In the field of electronic musical instruments and the like, it has been conventional to execute an automatic performance, such as an automatic rhythm or bass-chord performance, in accordance with a desired automatic performance pattern. Specifically, for chord-backing and bass parts, chord-backing and bass tones are automatically performed in accordance with predetermined automatic performance patterns on the basis of chords that are sequentially designated by a human player as a music piece progresses. For performance of a drum part, on the other hand, normal and variation patterns are arranged in advance so that an automatic performance can be executed by selecting any of these patterns (styles). The number of the arranged variation pattern is not always one, and in some cases two or more variation patterns are arranged previously. Generally, each of these performance patterns has a length or duration corresponding to one to several measures, and a successive automatic rhythm performance is carried out by repeating any of these previously-arranged performance patterns.

With such a conventional approach, the performance tends to become monotonous because it is based on repetition of the same pattern. To avoid the undesired monotonousness, it has also been customary in the art to previously arrange sub-patterns, such as those called "fill-in", "break" and "ad-lib", so that a performance based on any of these sub-patterns may be inserted temporarily in response to an instruction given by a human operator or player via predetermined switches or the like and then restored to a main pattern performance. The main pattern and sub-patterns are stored in a database, from which they are retrieved for reproduction in response to player's operation.

FIG. 11 is a block diagram showing exemplary transitions of various performance patterns (styles) in an automatic performance. The performance patterns in the illustrated example include first and second main patterns A and B (i.e., a normal pattern and a variation pattern), and two sets of first and second fill-in patterns corresponding to the main patterns A and B; that is, the two sets are a "A→A" fill-in pattern ("FILL AA" pattern) to be inserted during performance of the first main pattern A and a "A→B" fill-in pattern ("FILL AB" pattern) to be inserted for transition from the first main pattern A to the second main pattern B, and a "B→B" fill-in pattern ("FILL BB" pattern) to be inserted during performance of the second main pattern B and a "B→A" fill-in pattern ("FILL BA" pattern) to be inserted for transition from the second main pattern B to the first main pattern A. The performance patterns of FIG. 11 further include two pairs of intro patterns ("INTRO A" and "INTRO B") and ending patterns ("ENDING A" and "ENDING B") corresponding to the two main patterns A and B.

Although not specifically shown in FIG. 11, there are provided two fill-in pattern selecting switches ("FILL A" and "FILL B" switches) that are activated when one of the patterns (styles) is to be shifted to or replaced by another, two switches ("ENDING A" and "ENDING B" switches) for selecting a desired ending pattern, and two other switches ("INTRO A" and "INTRO B" switches) for selecting a desired one of the intro patterns.

For example, once the "INTRO A" switch is activated, the "INTRO A" pattern is first performed and then a performance of the first main pattern A is initiated upon termination of the "INTRO A" pattern performance. If the "FILL A" switch is depressed during the course of the performance of the first main pattern A, the "FILL AA" pattern is inserted and then the performance of the first main pattern A is resumed. Then, when the "FILL B" switch is depressed, the "FILL AB" pattern is inserted and then the main pattern B is performed. Once the "ENDING A" switch is depressed, the "ENDING A" pattern is performed to stop the performance of the entire music piece in question.

Similarly, once the "INTRO B" switch is activated, the "INTRO B" pattern is first performed and then a performance of the second main pattern B is initiated upon termination of the "INTRO B" pattern performance. If the "FILL A" switch is depressed during the course of the performance of the second main pattern B, the "FILL BA" pattern is inserted and then the first main pattern A is performed. Then, when the "FILL B" switch is depressed, the "FILL BB" pattern is inserted and then the second main pattern B is resumed. Once the "ENDING B" switch is depressed, the "ENDING B" pattern is performed to stop the performance of the entire music piece in question.

In this way, a fill-in pattern is selected, depending on the performance state when any one of the switches is depressed, corresponding to the currently-performed main pattern and destination (shifted-to or replacing) main pattern, and the thus-selected fill-in pattern is inserted. Such fill-in pattern insertion can effectively avoid unwanted monotonous of the music piece performance.

While FIG. 11 shows a case where two main patterns A and B are used, the number of the main patterns is of course not so limited and may be more than two. Further, there have been known various other manners of pattern variations and transitions than the above-mentioned; for example, the fill-in pattern insertion may be applied only to a selected musical instrument of a single performance part.

Among other known types of automatic performance devices than the above-discussed device is one which prestores, as SMF (Standard MIDI File)-format performance information, pitch, sounding-start and muffling-start timing, etc. Of each note contained in a desired music piece and generates tones by sequentially reading out the prestored pieces of the performance information (composition data). In this know automatic performance device, a human player only has to operate performance-start and performance-stop switches.

However, the conventionally-known electronic musical instruments, having functions to execute an automatic accompaniment and automatic performance, could not carry out a visual interaction with the users or players although they could provide an interaction by sound (aural interaction).

Some of the known electronic musical instruments are provided with a display section for visually showing a title of an automatically-performed or automatically-accompanied music piece and/or changing measures and tempo during the performance. Also known is a technique by which each key to be next depressed by the player is visually indicated on the display section. However, so far, there has been proposed or implemented no technique of visually showing a performance itself on the display section, and thus it has been impossible to visually ascertain a scene or situation of the performance.

SUMMARY OF THE INVENTION

It is therefore an object of the present invention to provide a tone and picture generator device which can display performance motions, corresponding to a performance style, in synchronism with a music performance, to thereby allow a player to perform while viewing and enjoying performance of various musical instruments.

In order to accomplish the above-mentioned object, the present invention provides a tone and picture generator device which comprises: a tone generator section that generates a tone on the basis of performance information; and a picture generator section that, in synchronism with said performance information, generates picture data illustrating a performance scene of a selected musical instrument or part corresponding to the performance information.

With this arrangement, a current performance scene or situation of a selected musical instrument or voice part can be visually shown on a graphical display unit in synchronism with the performance information or composition data, which allows a player to enjoy interactions, both aural and visual (i.e., by tone and picture), with an instrument using the generator device of the invention.

According to a preferred implementation of the present invention, the tone and picture generator device further comprises a motion component database that stores therein various motion components each including motion information representative of a trajectory of performance motions of a subdivided performance pattern for each musical instrument or performance part, and the generator section reads out, from the motion component database, one of the motion components corresponding to the performance information and generates animated picture data corresponding to the performance information on the basis of information that is created by sequentially joining together the motion components read out from the motion component database.

By virtue of the database storing the motion components, common or same motion components can be used for a plurality of different patterns or music pieces, and any necessary components can be additionally stored in the database whenever necessary. As a consequence, various 3-D animated pictures can be generated with increased efficiency. The use of such 3-D animated picture data allows the users to enjoy more real, stereoscopic animated pictures.

Further, according to the present invention, each of the motion components includes not only the motion information representative of a trajectory of performance motions of a subdivided performance pattern but also a sounded point marker indicative of each tone-generation timing in the motion information. Thus, common motion components can be used for different performance tempos, which thereby permits a significant reduction in the size of the database. Further, using the sounded point marker for synchronization with the tone generator section, the tone and picture can be synchronized with each other with high accuracy.

In addition, the present invention allows a human operator or player to change a "character" playing in the performance scene to be displayed and viewpoint of the 3-D animated picture data, so that the human operator can enjoy a variety of 3-D animated pictures and also can cause a model performance to be displayed on a magnified scale.

The tone and picture generator device of the present invention may further comprise a section for modifying the motion information in response to a change in the playing (player-representing) character and/or viewpoint. With this modifying section, common motion information can be used for different player-representing characters and viewpoints, which can even further reduce the size of the database.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
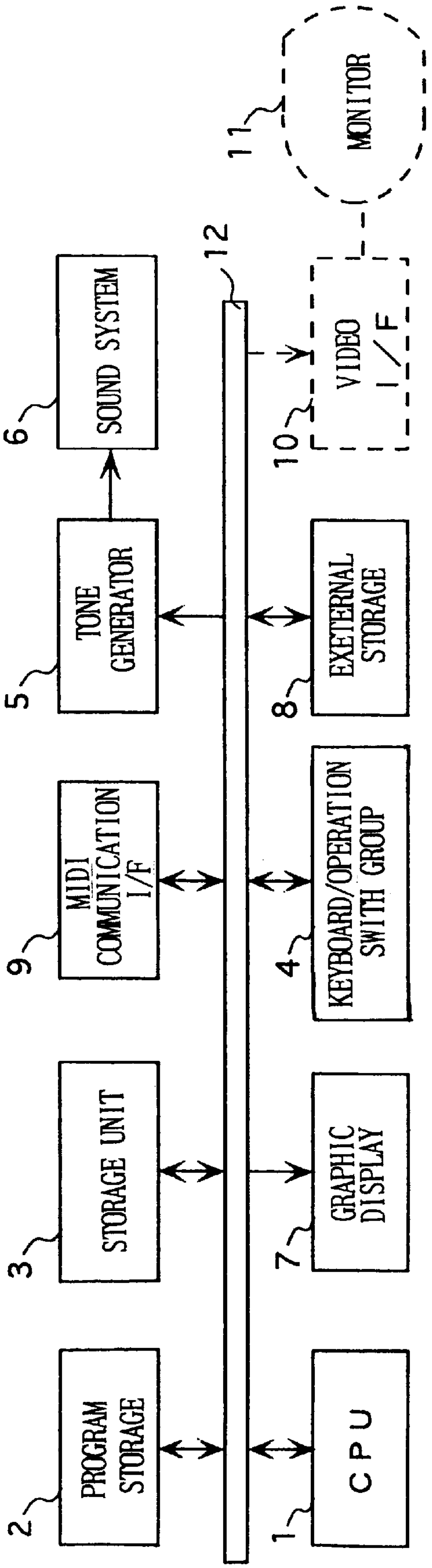
FIG. 1 is a block diagram showing an exemplary organization of a tone and picture generator device in accordance with an embodiment of the present invention.

FIG. 1 is a block diagram showing an exemplary organization of a tone and picture generator device in accordance with an embodiment of the present invention. In FIG. 1, the tone and picture generator device includes a central processor unit (CPU) 1 for controlling various operations to be performed in the entire device, a program storage 2 for storing a control program to control this tone and picture generator device, and a storage unit 3, such as a ROM and RAM, which contains a style database storing various automatic performance patterns such as rhythm patterns and automatic bass-chord patterns, motion-component and scene-component databases for generation of a three-dimensional (hereinafter "3-D") picture indicative of a current scene or situation of a performance and which is also used for storing various other data and as working areas for the CPU. Moreover, the tone and picture generator device includes a keyboard/operation switch group provided on an operation panel, which includes a keyboard and various operators such as button switches to be described later. Reference numeral 5 denotes a tone generator section that generates signals of scale tones and rhythm tones for a plurality of channels using any one of the known tone generation schemes such as the waveform memory scheme, FM scheme, physical model scheme, harmonics synthesis scheme, formant synthesis scheme and analog synthesizer scheme based on a well-known combination of VCO, VCF and VCA. The tone generator section is not necessarily limited to a circuit based on dedicated hardware; it may be a tone generator circuit based on a combination of a DSP and microprograms or a combination of a CPU and software program. The tone generator section 5 also includes an effect processing (effector) section that imparts various effects, such as a vibrato and reverberation, to the generated tone signals, although not specifically shown here. Further, reference numeral 6 denotes a sound system that audibly reproduces or sounds the tone signals output from the tone generator section 5.

The tone and picture generator device in the illustrated embodiment further includes a graphic display unit 7, which visually shows operating states of the tone and picture generator device as well as operational states of the operation switches and which also shows, in a 3-D animated picture, a performance scene or situation of a selected musical instrument or part.

Further, in FIG. 1, reference numeral 8 denotes an external storage device such as a hard disk drive, floppy disk drive, CD-ROM drive, MO drive and/or DVD drive, and reference numeral 9 denotes a MIDI communication interface (I/F) circuit for communication with an external MIDI instrument. The tone generator section 5 is further provided with a video interface circuit 10 for displaying the picture indicative of a performance scene on an external monitor 11, and a bus 12 for data transfer between the various components mentioned above.

Figure 2:
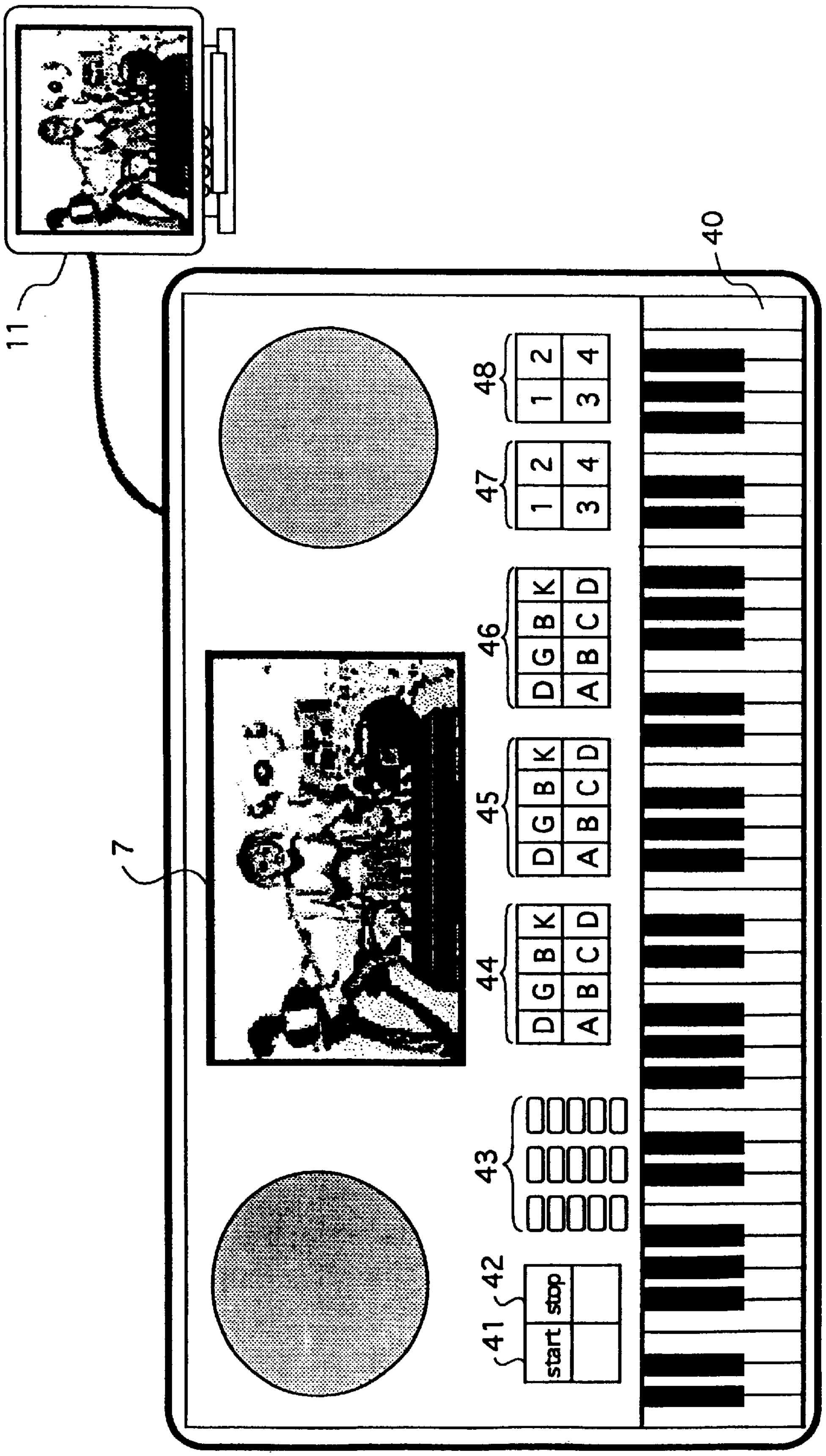
FIG. 2 is a diagram showing an exemplary outward appearance of the tone and picture generator device shown in FIG. 1.

FIG. 2 is a diagram showing an exemplary outward appearance of the tone and picture generator device shown in FIG. 1. In the illustrated example, the operation switch group 4 includes the keyboard 40; a start switch 41 for instructing a start of an automatic performance, a stop switch 42 instructing a stop of an automatic performance, and a style selection switch set 43 for selecting performance patterns, such as rhythm, main and variation patterns, to be automatically performed. The operation switch group 4 also includes an instrument change switch set 44 for selecting a musical instrument or part whose current performance scene is to be visually displayed, a player change switch set 45 for selecting a playing (player-representing) character that is to be used for displaying the performance scene, a fill-in switch set 46 for selecting a musical instrument for which a fill-in pattern performance is to be executed, a stage change switch set 47 for selecting a background to be used when the performance scene is to be displayed, and a viewpoint change switch set 48 for setting a viewpoint when the performance scene is to be displayed. Keys labeled "D", "G", "B" and "K", on upper rows of the above-mentioned instrument change switch set 44, player change switch set 45 and fill-in switch set 46, are provided for selecting a drum part, guitar part, bass part and keyboard part, respectively, and keys labeled "A", "B", "C" and "D" on lower rows of these switch sets are for selecting respective details of the individual parts selected via the upper-row keys "D", "G", "B" and "K".

Further, in the illustrated example of FIG. 2, performance scenes or situations of a plurality of the parts (e.g., three parts consisting of the keyboard, bass and drum parts) are being visually displayed on the graphic display unit 7 (or on the external monitor 11) in a 3-D animated picture.

Before describing processing for displaying such a 3-D animated picture, the motion-component database 20 will be described first. In this motion-component database 20, various performance patterns are subdivided for each one of the various musical instruments or parts, and performance motions corresponding to the subdivided performance patterns are each acquired as motion capture data, developed in the x-, y- and x-axis directions and then stored along with data indicative of their respective tone-generation timing (e.g., striking points in the case of a drum). The data indicative of each of the subdivided performance patterns will hereinafter be called a "motion component", and the data indicative of the respective tone-generation timing will be called "sounded point marker" data.

Figure 3:
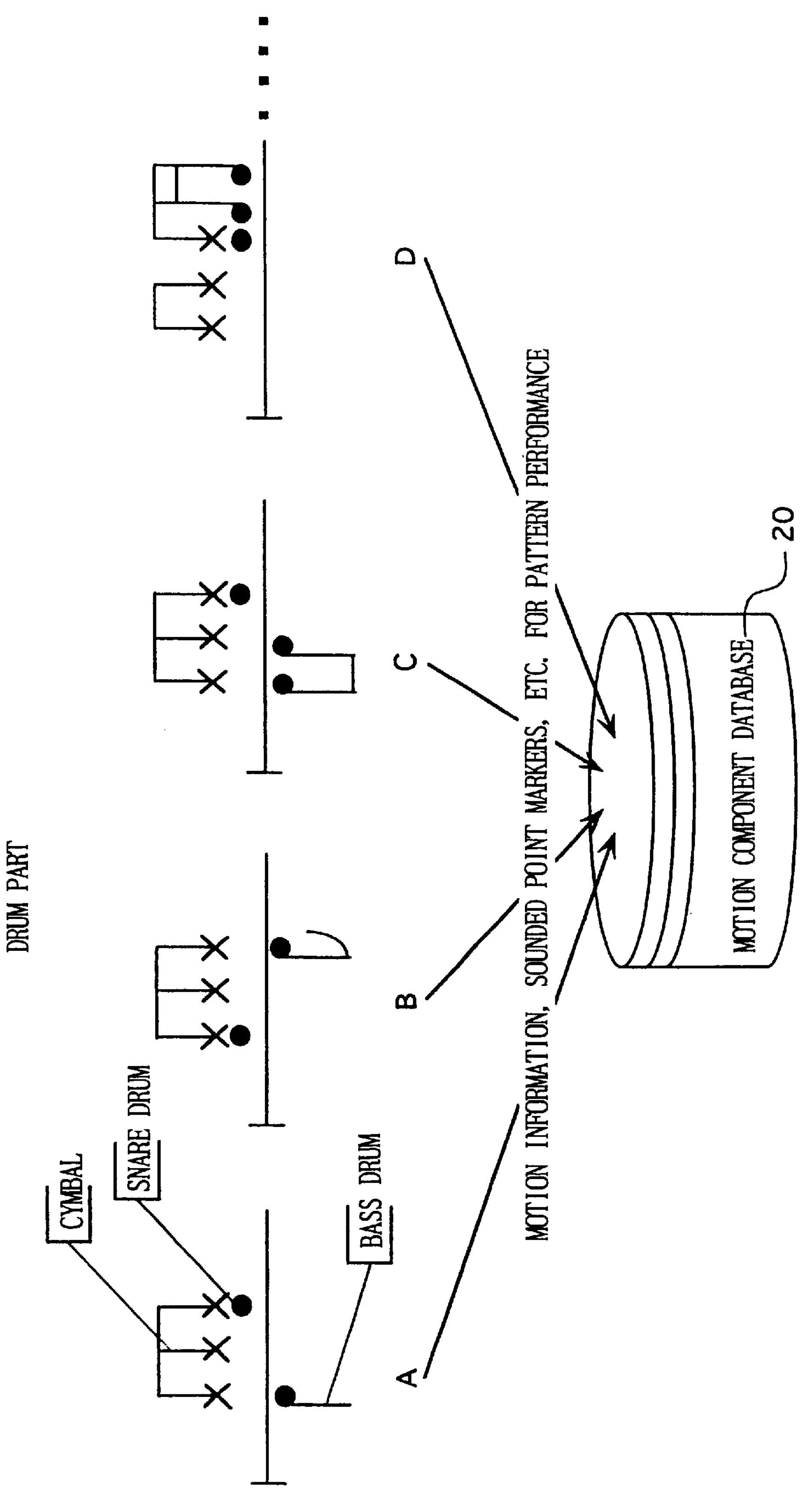
FIG. 3 is a diagram explanatory of a motion component database employed in the tone and picture generator device of FIG. 1.

FIG. 3 is a diagram illustrating motion components for the drum part. As shown, each of the motion components stored in the database 20 is made up of motion information that is, for one of the subdivided drum-part performance patterns corresponding to short phrases A, B, C, D, . . . , indicative of a motional trajectory of a human player during the pattern performance and the sounded point marker data corresponding thereto. While a single motion component is shown here as being composed of the motion information of a set of three musical instruments, i.e., cymbal, snare drum and bass drum, such a motion component is normally created per musical instrument in the case of piano, saxophone and the like.

Now, a process for generating the motion components will be described more fully with reference to the flow chart of FIG. 4. First step S10 of this motion component creation process is directed to acquiring, as "motion capture data", a motional state of the player performing a particular subdivided phrase on a particular musical instrument.

Figure 5A:
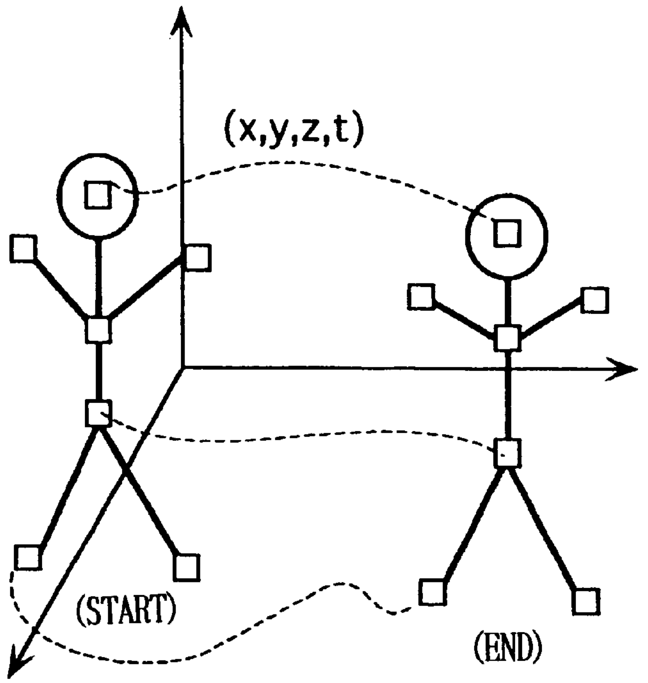
FIGS. 5A and 5B are schematic diagrams explanatory of the motion component creation process.

FIG. 5A is a diagram explanatory of how the player's motional state is acquired as the motion capture data. As shown, the player is asked to perform the particular subdivided phrase with 3-D digitizers attached to principal portions of the player's body and, if necessary, to the musical instrument as well, and motions of the player during the performance are recorded in a sequential manner. The 3-D digitizers employed here may be of a known magnetic or optical type.

Figure 4:
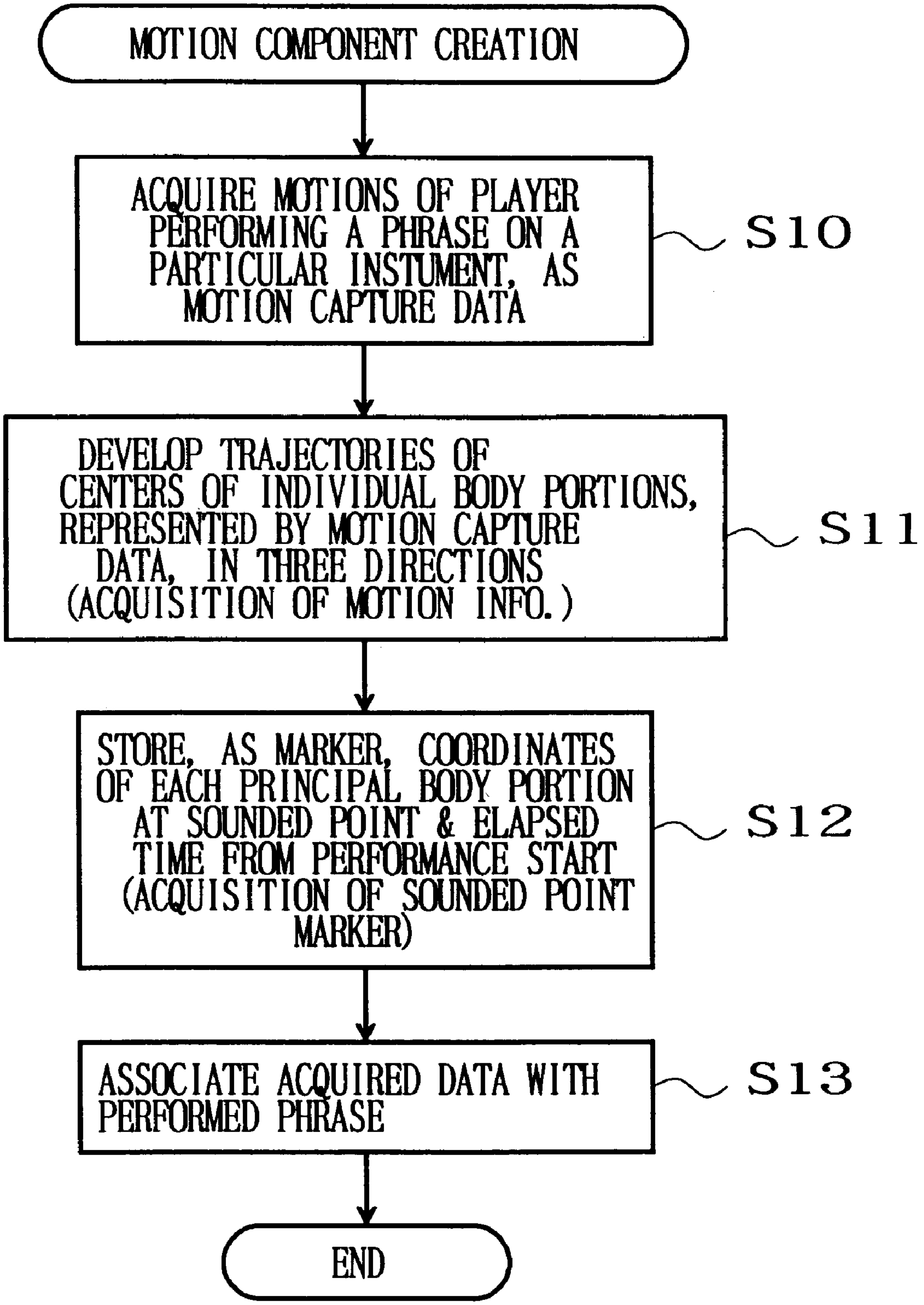
FIG. 4 is a flow chart illustrating an exemplary operational sequence of a motion component creation process executed in the generator device.

At next step S11 of FIG. 4, trajectories of the respective centers of the individual body portions, as represented by the thus-acquired motion capture data, are developed in the x, y z coordinates so as to acquire motion information indicative of movements and positions of the individual body portions. At that time, time data may also be recorded in association with the motion information.

Then, the motion creation process moves on to step S12, where the coordinates of each of the principal body portions at a point where a tone has been generated (sounded point) and the elapsed time from the start of the performance to the sounded point are stored as a sounded point marker in any desired distinguishable form. If the performance is of a phrase shown in FIG. 5B, three points labeled "X" in the figure are sounded points and the respective elapsed times of these sounded points t, t' and t" are stored in distinguishable form. It will be appreciated that these sounded point markers may be in any suitable format as long as they can properly identify the sounded points from among the acquired motion capture data.

Following step S12, the process proceeds to step S13, where the data acquired in the above-mentioned manner are associated with the phrase performed by the player and then stored into the database as data in such a format which can appropriately deal with any positional changes (e.g.,changes in the shape and size of the player and musical instrument) and/or time changes (e.g., tempo change) that may take place in subsequent reproduction of the acquired data.

Note that the above-mentioned motion component data may contain other data, such as those indicative of respective moving velocity and acceleration of the individual body portions, in addition to the x, y and z coordinates, time data and sounded point markers.

Figure 6:
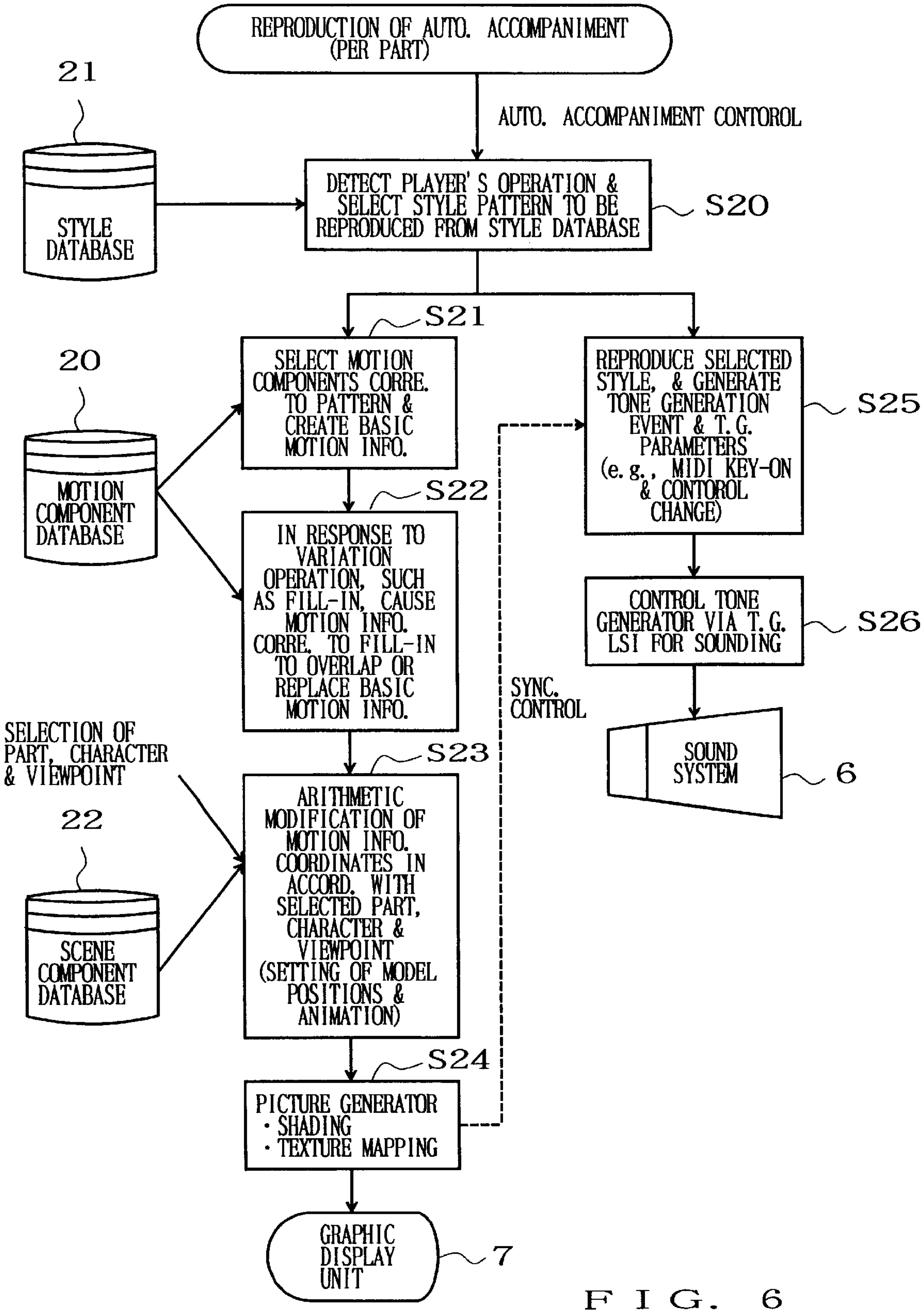
FIG. 6 is a flow chart illustrating operational sequences of a picture generation/display process and a tone generation process to be executed during an automatic accompaniment in the generator device.

The following paragraphs describe a process for generating and visually displaying a 3-D animated picture by use of the thus-created motion component database 20, in relation to a device equipped with an automatic accompaniment function. FIG. 6 is a flow chart illustrating operational sequences of a picture generation/display process and a tone generation process during automatic accompaniment reproduction; in particular, FIG. 6 illustrates an exemplary operational flow for reproducing a 3-D animated picture visually showing a tone of one part and a performance scene corresponding thereto. If performance scenes of a plurality of parts are to be displayed, it is only necessary that the same process as shown in FIG. 6 be carried out for each of the parts and then the processed results be displayed in a combined format.

First, once the player activates any of the above-mentioned operation switches to initiate an automatic accompaniment, a performance style data is selected from among those stored in the above-mentioned style database 21, similarly to the conventionally-known automatic accompaniment function. The thus-selected performance style data is then delivered to operations of steps S21 and S25.

Step S25 is directed to the operation similar to the conventional automatic accompaniment process; more specifically, this step generates tone generation event data, such as a MIDI key-on event and control change, and tone generator controlling parameters ("T.G. parameters") on the basis of performance information included in the selected performance style data. The tone generator controlling parameters, etc. generated in this manner are then passed to the tone generator section 5, which, in turn, generates a corresponding tone signal (step S26) to be audibly reproduced through the sound system 26.

At step S21, the motion components corresponding to the selected performance style data are selected from among those stored in the above-mentioned motion component database 20, to thereby generate basic motion information to be described below. Because the motion components corresponding to the individual performance styles can be known previously, it is possible to include, in the selected performance style data, such data indicative of the corresponding motion components.

Figure 7A:
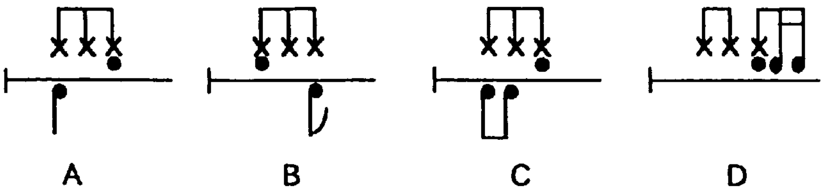
FIGS. 7A to 7C are diagrams explanatory of an example of a basic motion information creation process executed in the generator device.
Figure 7B:
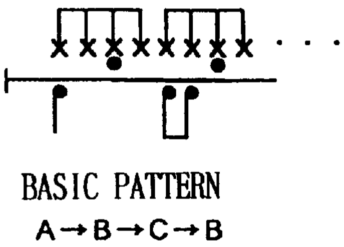

One exemplary process for generating the basic motion information will be described in detail below with reference to FIGS. 7A and 7B, of which FIG. 7A shows example phrases corresponding to various motion components stored in the motion component database 20. Namely, in this motion component database 20, there are prestored motion components in association with phrases A, B, C, D, . . . shown in FIG. 7A. Assuming that a performance pattern corresponding to the selected performance style is the one shown in FIG. 7B, the motion components corresponding to the performance pattern are read out from the motion component database 20. Then, every adjacent motion components thus read out from the database 20 are joined together by causing a trailing end portion of the preceding motion component and a leading end portion of the succeeding motion component to overlap each other, so as to create the basic motion information. Thus, for the basic pattern of FIG. 7B, the motion components associated with the phrases A, B, C, B will be sequentially joined together in the mentioned order (A→B→C→B).

Figure 7C:
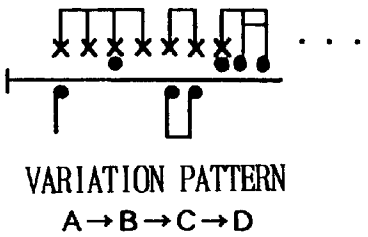

When the player has instructed a variation operation, such as insertion of a fill-in, for the particular musical instrument, the process goes to step S22 of FIG. 6, where the motion information corresponding to the fill-in pattern is caused to overlap or replace the basic motion information generated at step S21. If the style pattern to be performed is a variation pattern as shown in FIG. 7C, i.e., if a fill-in operation is to be effected for the cymbal and snare drum in the drum part, the last portion of the basic motion information (A→B→C→B) generated at step S21 and the data immediately preceding the same are replaced by the data of the motion component D, to thereby provide motion information corresponding to the variation pattern. By thus replacing part of the motion components with part of another motion component, it is possible to properly deal with the instructed variation operation.

After that, the process of FIG. 6 moves on to step S23 in order to selectively read out, from the scene component database 22, the information corresponding to displayed-part selection data entered via the above-mentioned instrument change switch set 44, playing-character selection data entered via the player change switch set 45, viewpoint change operation data entered via the viewpoint change switch set 48 and stage change operation data entered via the stage change switch set 47.

Step S23 also modifies the coordinates data included in the motion component information. Namely, step S23 reads out, from the scene component database 22, the scene components corresponding to the part or musical instrument whose performance scene is to be displayed, i.e., a player-representing character who is performing, selected stage and designated viewpoint (camera position). Note that when an instruction is given to simultaneously display a plurality of parts and musical instruments, the scene components corresponding to the positional arrangement of these parts or instruments are read out from the database 22.

Figure 8:
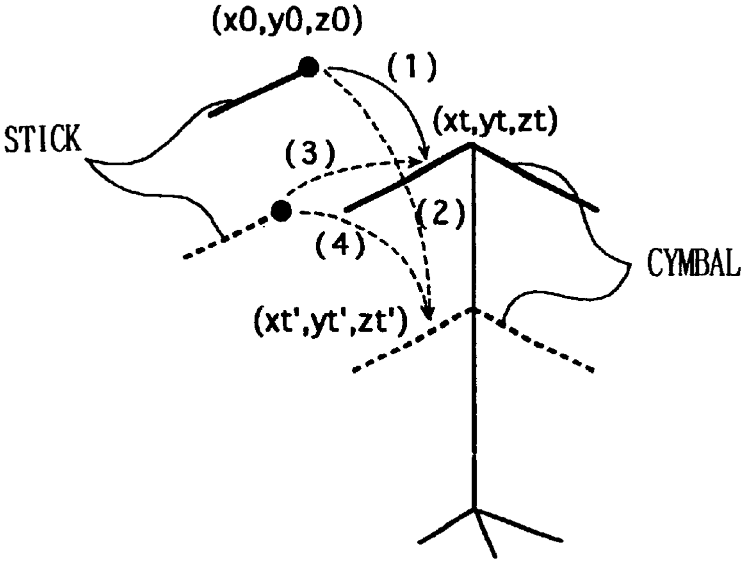
FIG. 8 is a diagram explanatory of a coordinates modification process executed in the generator device.

The following paragraphs describe an example of the coordinates modification process, with reference to FIG. 8. This example assumes that the musical instrument whose performance scene is to be displayed is cymbal and the motion information contains a trajectory of the stick (denoted by "(1)") extending from an initial position (x0, y0, z0) to a target position (xt, yt, zt) on the cymbal. Let's also assume here that the height of the cymbal is varied by data such as that of the player-representing character or viewpoint selected by the human operator, so as to assume a target coordinates position (xt', yt', zt'). In this case, the above-mentioned motion information is modified at step S23 to achieve a trajectory as denoted by "(2)". When the player-representing character has been changed and the initial position of the stick has been changed to one denoted by a dotted line in FIG. 8, the above-mentioned motion information is modified to achieve a trajectory as denoted by "(3)". When both the player-representing character and the cymbal's height have been changed, the above-mentioned motion information is modified to achieve a trajectory as denoted by "(4)".

In this manner, step S23 sets model positions and animated picture corresponding to the model positions.

Then, the routine goes to step S24, where a picture generation (rendering) process is carried out on the basis of the information having been set at step S23. Namely, at this step, the scene is visualized in a video form on the basis of the above-mentioned scene information and motion information. More specifically, on the basis of the scene information and motion information, there are performed coordinates conversion, hidden scene erasure, calculation of intersecting points, lines, planes and the like, shading, texture mapping, etc. to compute the luminance of each pixel and pass it to the graphic display unit 7.

As previously noted, each of the motion components stored in the motion component database 20 contains the sounded point marker as well as the coordinates data along the time axis, so that, in this embodiment, each picture and a corresponding tone can be accurately synchronized with each other on the basis of the sounded point marker.

Namely, on the basis of such sounded point markers, it is possible to compute each coordinates position and a time length and moving speed from a start of reproduction of the corresponding motion information to each sounded point.

Figure 5B:
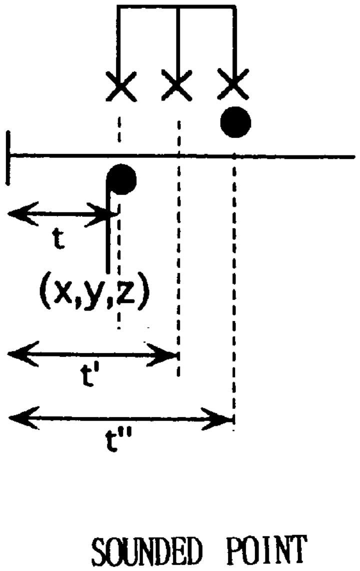

Namely, as previously described in relation to FIG. 5B, the time values t, t', t", at the basic tempo, up to each sounded point can be acquired from the motion component. Therefore, if a performance tempo has been increased by a factor of k from the basic tempo with which the motion component was created, it is sufficient that control be performed for thinning out the motion-information reading operations or repeatedly reading the same motion position so as to make shorter or longer the reproduction intervals of the motion information in such a manner that the desired sounded point can be reached from the start of reproduction of the motion information within only 1/k of the original time (or at k times the original speed). Where a moving time or speed is prepared for each coordinates position, i.e., where information indicative of a time or speed for each body portion to move from one coordinates position to a next one is contained in the motion information, and if such information is representative of time, then the control may be executed to modify the time to 1/k of the original, or if the information is representative of speed, then the control may be executed for modifying the speed to k times the original.

In this way, it is possible to generate a performance picture with an accurate sounded point in accordance with the current performance tempo.

Further, reliability in synchronizing the tone and picture to be generated can be greatly enhanced if the picture generating step S24 is arranged to inform the tone generator control parameter generating step S25 of the arrival at the picture generating process for the sounded point.

In the above-mentioned manner, the performance scene of any selected part can be displayed, in a 3-D picture, in accurate synchronism with the automatic accompaniment data.

Figure 9:
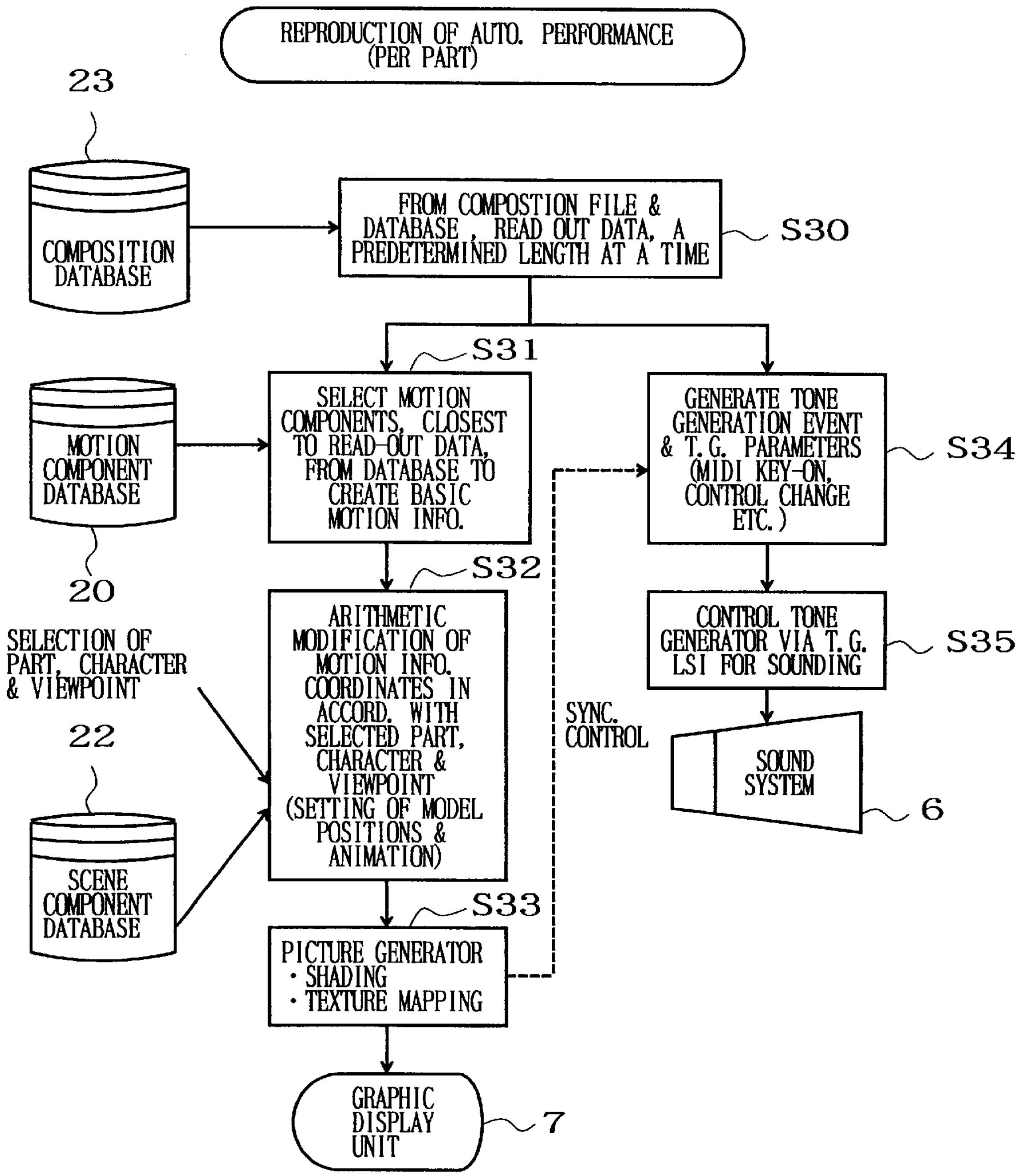
FIG. 9 is a flow chart illustrating operational sequences of a picture generation/display process and a tone generation process executed during an automatic performance in the generator device.

The following paragraphs describe an example were the principle of the present invention is applied to an automatic performance device for reproducing composition data of a desired music piece, with reference to the flow chart of FIG. 9 (reproduction of an automatic performance). Where such a reproductive automatic performance is to be carried out, performance information (composition data) of the music piece to be performed is prestored in a composition database 23. Once the human operator or player selects a music piece to be automatically performed, the composition data of the selected music piece are sequentially read out at step S30 from the composition database 23, a predetermined data length at a time. The read-out data are then given to steps S31 and S34, which, similarly to steps S25 and S26 of the automatic accompaniment process, generates a tone signal based on the read-out data and audibly reproduces the tone signal through the sound system 6.

Steps S31 to S33 are directed to generating a 3-D animated picture corresponding to the read-out data. At step S31, some of the motion components closest to the predetermined length of the read-out data are selectively read out. Then, similarly to step S21 above, every adjacent motion components thus read out are joined together by causing a trailing end portion of the preceding motion component and a leading end portion of the succeeding motion component to overlap each other, so as to create basic motion information. Namely, a length of data corresponding to the subdivided phrase (hereinafter called a "first segment") is extracted from the beginning of the performance data, and the motion component corresponding to the phrase closest to the extracted first segment is read out from the database 20. Then, similarly, a second segment is extracted with the end of the first segment set at the beginning of the second segment, and the motion component corresponding to the phrase closest to the second segment is read out from the motion component database 20 and joined to the first read-out motion component. The aforementioned procedures are repeated to join together every subsequent components, to thereby create the basic motion information.

Whereas the preceding paragraphs have described the case where general-purpose motion components are applied to optionally-selected composition data, the motion components may be arranged in standardized basic sets (e.g., such that basic tone colors are automatically associated by tone color numbers as with "GM" basic tone colors), motion component designating information, corresponding to the motion components of the basis set to be used in the composition data may be included in accordance with the progression of the music piece.

Afterwards, model positions and animated picture corresponding thereto are set at step S32 in a similar manner to step S23, and then the routine moves on to step S33 where, similarly to step S24 above, a 3-D animated picture is generated and visually shown on the graphic display unit 7.

In the above-mentioned manner, a 3-D animated picture representative of the performance scene of that music piece can be displayed also in the case of the automatic performance.

Figure 10:
FIG. 10 is a diagram showing another example of the outward appearance of the tone and picture generator device.
Figure 11:
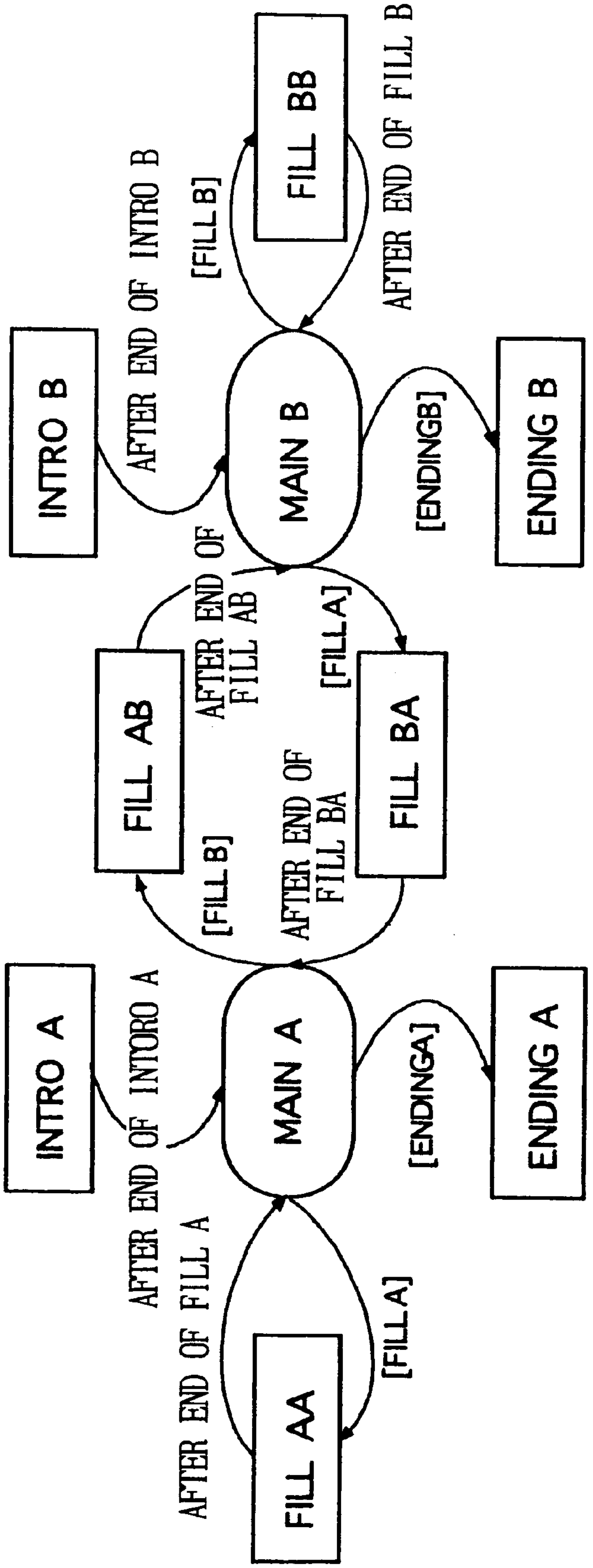
(PRIOR ART) FIG. 11
FIG. 11 is a block diagram showing an exemplary transition of performance patterns occurring during an automatic accompaniment.

Further, in FIG. 10, there is shown another example of the external appearance of the tone and picture generator device in accordance with the present invention. In the illustrated example, various operators are disposed to the left and right of the graphic display unit 7, and a current performance scene of a single part (drum part in this case) is being demonstrated in a 3-D animated picture on the display screen. Here, the operator 51 is an automatic-performance start button, the operator 52 is an automatic-performance stop button, 53 is a tempo-up button for making the performance tempo faster, 54 is a tempo-down button for making the performance tempo slower, 55 is a player selection button for selecting a player-representing character to be used in showing a current performance scene on the graphic display unit 7, and 56 is a musical instrument selection button for selecting a particular musical instrument whose current performance scene is to be shown on the graphic display unit 7. Further, the operators 57 and 58 are buttons for selecting a desired main pattern (main style) of an automatic performance; specifically, 57 is a main-A button for selecting the A main pattern while 58 is a main-B button for selecting the B main pattern. 59 is an intro button for selecting an intro pattern, 60 is a fill-in button for selecting a fill-in pattern, and 61 is an ending button for selecting an ending pattern. Further, the operator 62 is a viewpoint moving button for moving a viewpoint when a three-dimensional performance scene is to be shown on the above-mentioned graphic display unit 7.

In the above-mentioned manner, the current performance scene of one or any other number of parts can be displayed.

It should be apparent that the principles of the present invention are also applicable to sequencers having no keyboard section. Further, whereas the present invention has been described above in relation to an automatic accompaniment or automatic performance, it may be used to display a 3-D animated picture corresponding to melody-part performance data entered by manual operation such as key depression.

According to the present invention, the effect to be imparted in the tone generator section 5 may be changed in accordance with a stage selected via the above-mentioned stage change switch set 47. For instance, the effect may be varied depending on a situation of the picture to be displayed; that is, if a "concert hall stage" is selected, a delay effect may be made greater, or if an "outdoor stage" is selected, the delay may be made smaller.

Furthermore, whereas the present invention has been described in relation to the case where pieces of motion information (motion files) are acquired by the motion capture scheme, the motion information may be created by any other schemes than the motion capture scheme.

With the above-mentioned arrangements, the present invention can display a 3-D animated pictures in synchronism with composition data, so that the human operator or player can enjoy visual interaction, based on the 3-D animated picture, as well as interaction by sound.

Further, by virtue of the database storing motion components, common motion components can be used for a plurality of different patterns or music pieces, and any necessary components can be additionally stored in the database whenever necessary. As a consequence, various 3-D animated pictures can be generated with increased efficiency.

Furthermore, because each of the motion components includes sounded point markers in association with motion information, common motion components can be used for different performance tempos, which permits a significant reduction in the size of the database.

Moreover, with the present invention, the human operator can select a character, suiting his or her preference, from among a plurality of player-representing characters.

In addition, because the human operator is allowed to change the viewpoint of the displayed picture, it is possible to observe a model performance scene in any desired position, and the thus-shown model performance scene can be used for teaching purposes as well.

What is claimed is:

1. A tone and picture generator device comprising:

a tone generator section that generates a tone on the basis of performance information;

a storage section that stores therein a plurality of motion components each including motion information representative of a trajectory of performance motions corresponding to a performance pattern; and a picture generator section that, on the basis of the performance information, read out from said storage section one of the motion components corresponding to the performance information and, in synchronism with said performance information and on the basis of the motion component read out from said storage section, generates picture data illustrating a performance scene of a selected musical instrument or part corresponding to the performance information.

2. A tone and picture generator device as recited in claim 1, wherein said motion component represents a trajectory of performance motions of a subdivided performance pattern for each musical instrument or performance part, and wherein said picture generator section reads out, from said storage section, one of the motion components corresponding to the performance information and generates animated picture data corresponding to the performance information on the basis of information that is created by sequentially joining together the motion components read out from said storage section.

3. A tone and picture generator device as recited in claim 1, wherein said motion component includes motion information representative of a trajectory of performance motions of a subdivided performance pattern and a sounded point marker indicative of tone-generation timing in the motion information.

4. A tone and picture generator device as recited in claim 1, wherein said picture data is three-dimensional animated picture data.

5. A tone and picture generator device as recited in claim 4 wherein a player-representing character and viewpoint illustrated by the three-dimensional animated picture data can be changed by a human operator.

6. A tone and picture generator device as recited in claim 5 which further comprises a section that modifies the motion information in accordance with a change in the player-representing character and viewpoint.

7. A tone and picture generating method comprising the steps of:

providing performance information;

generating a tone on the basis of said performance information;

storing a plurality of motion components each including motion information representative of a trajectory of performance motions corresponding to a performance pattern;

on the basis of the provided performance information, reading out one of the stored motion components corresponding to the provided performance information; and in synchronism with the provided performance information, and on the basis of the read out motion component, generating picture data illustrating a performance scene of a selected musical instrument or part corresponding to the performance information.

8. A tone and picture generating method as recited in claim 7, further comprising the step of generating animated picture data corresponding to said performance information on the basis of information that is created by sequentially joining together the motion components read out, wherein said plurality of motion components represent a trajectory of performance motions of a subdivided performance pattern for each musical instrument or performance part.

9. A machine-readable recording medium containing a group of instructions of a tone and picture generating method to be executed by a processor, said method comprising the steps of:

receiving performance information;

generating a tone on the basis of said performance information received by the step of receiving;

storing a plurality of motion components each including motion information representative of a trajectory of performance motions corresponding to a performance pattern;

on the basis of the received performance information, reading out one of the stored motion components corresponding to the received performance information; and in synchronism with said performance information received by the step of receiving, and on the basis of the read out motion component, generating picture data illustrating a performance scene of a selected musical instrument or part corresponding to the received performance information.

10. A tone and picture generator device comprising:

means for providing performance information;

means for generating a tone on the basis of the provided performance information;

means for storing a plurality of motion components each including motion information representative of a trajectory of performance motions corresponding to a performance pattern;

means for reading one of the stored motion components corresponding to the provided performance information; and means for, in synchronism with the provided performance information and on the basis of the read out motion component, generating picture data illustrating a performance scene of a selected musical instrument or part corresponding to the performance information.

* * * * *